US010534636B2

(12) United States Patent
Vadapandeshwara et al.

(10) Patent No.: US 10,534,636 B2
(45) Date of Patent: Jan. 14, 2020

(54) INTERFACE AND RUNTIME ENVIRONMENT FOR PROCESS DEFINITION AND PROCESS EXECUTION TRACKING

(71) Applicant: ORACLE FINANCIAL SERVICES SOFTWARE LIMITED, Mumbai (IN)

(72) Inventors: Rajaram N. Vadapandeshwara, Bangalore (IN); Charles Rajkumar, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 260 days.

(21) Appl. No.: 15/457,180

(22) Filed: Mar. 13, 2017

(65) Prior Publication Data

US 2018/0260239 A1 Sep. 13, 2018

(51) Int. Cl.
*G06F 9/46* (2006.01)
*G06F 9/48* (2006.01)
(Continued)

(52) U.S. Cl.
CPC .......... *G06F 9/4843* (2013.01); *G06F 9/466* (2013.01); *G06F 9/5005* (2013.01);
(Continued)

(58) Field of Classification Search
None
See application file for complete search history.

(56) References Cited

U.S. PATENT DOCUMENTS

2005/0261914 A1* 11/2005 Brookins ............... G06F 9/465
705/7.11
2009/0064104 A1 3/2009 Baeyens et al.
(Continued)

OTHER PUBLICATIONS

Worzberger et al, DYPROTO—tools for dynamic business processes, International Journal of Business Process Integration and Management, vol. 5, No. 4, pp. 324-343, 2011.*
(Continued)

*Primary Examiner* — Diem K Cao
(74) *Attorney, Agent, or Firm* — Kraguljac Law Group, LLC

(57) ABSTRACT

Systems, methods, and other embodiments associated with defining and executing a process within a single runtime environment are described. In one embodiment, a method includes executing a definition interface in the runtime environment for defining the process. The example method may also include receiving input of a process definition of the process through the definition interface and storing the process definition into a data structure. The example method may also include generating and displaying a selection interface populated with a plurality of execution types such as a workflow, a batch execution job, an analytical pipeline, and an interactive application interface. The example method may also include receiving a selected execution type through the selection interface and executing the process using the process definition that is transformed during execution to be compatible with the selected execution type. An execution interface, populated with process execution information, is executed in the runtime environment.

20 Claims, 7 Drawing Sheets

(51) Int. Cl.
  *G06F 9/50* (2006.01)
  *G06F 3/0482* (2013.01)
  *G06F 3/0484* (2013.01)
  *G06F 3/0481* (2013.01)
  *G06F 3/0486* (2013.01)

(52) U.S. Cl.
  CPC .......... *G06F 3/0482* (2013.01); *G06F 3/0486* (2013.01); *G06F 3/04817* (2013.01); *G06F 3/04847* (2013.01)

(56) References Cited

U.S. PATENT DOCUMENTS

| | | | | |
|---|---|---|---|---|
| 2012/0084366 A1* | 4/2012 | Killoran, Jr. | ..... | G06Q 10/06311 709/206 |
| 2014/0095267 A1* | 4/2014 | Patil | ...... | G06Q 10/06 705/7.36 |
| 2015/0046929 A1* | 2/2015 | Kumar | ...... | G06Q 10/10 718/106 |

OTHER PUBLICATIONS

Fahad et al, Dynamic Execution of Business Process via Web Service SElection and Orchestration, Elsevier B.V, pp. 1655-1664, 2015.*

Vasilecas et al., Rule-and context-based dynamic business process modelling and simulation, Elsevier, Oct. 2016, pp. 1-15.*

Search Report in co-pending PCT Appl. No. 14/714,598PCT/IB2018/000332 filed Mar. 12, 2018, dated Jul. 9, 2018. (18 pgs).

Zaplata et al., Flexible Execution of Distributed Business Processes based on Process Instance Migration, pp. 3-16, Journal of Systems Integration, Mar. 2010.

Torres, et al., Building Business Process Driven Web Appications, Dept. of Information System and Computation, Technical Univ. of Valencia, Valencia, Spain, pp. 322-337, 2006.

Dongsoo, et al., Dynamic Business Process Management based on Process Change Patterns, Intl. Conference on Convergence Information Technology, pp. 1154-1161, 2007.

* cited by examiner

INTERFACE AND RUNTIME ENVIRONMENT FOR PROCESS DEFINITION AND PROCESS EXECUTION TRACKING

BACKGROUND

Many businesses use multiple tools for defining and implementing processes. For example, regulatory compliance, such as in a financial sector, a risk sector, or a criminal sector, use multiple software applications and tools to address regulatory compliance requirements. In one example, a financial institution may have multiple departments that focus on different aspects of a solution to addressing a regulatory compliance requirement. Each aspect is addressed with a purpose specific software tool with no visible tie-in or traceability across tools. For example, a business department may use one tool to draft and record a regulatory compliance process. Another department may use other tools to individually build solution components to implement each part of the regulatory compliance process. Users may work in isolation to implement worklist items of the solution components with datasets in private sandboxes, such as using information locally stored on a personal computer accessible only to a particular user. Thus, numerous unlinked software tools are used by different departments of the financial institution to define a process, build solution components to implement parts of the process, implement workflow items of the solution components, etc.

Unfortunately, there is a lack of traceability between the application tools used to define the process, build the solution components, implement workflow items, and define and implement other sub-parts of a solution. Thus, a substantial amount of manual effort is used to link the sub-parts of the solution, which can lead to increased costs and user error. For example, a compliance reviewer may be unable to adequately trace and understand how compliance with a regulatory compliance requirement was defined and implemented.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
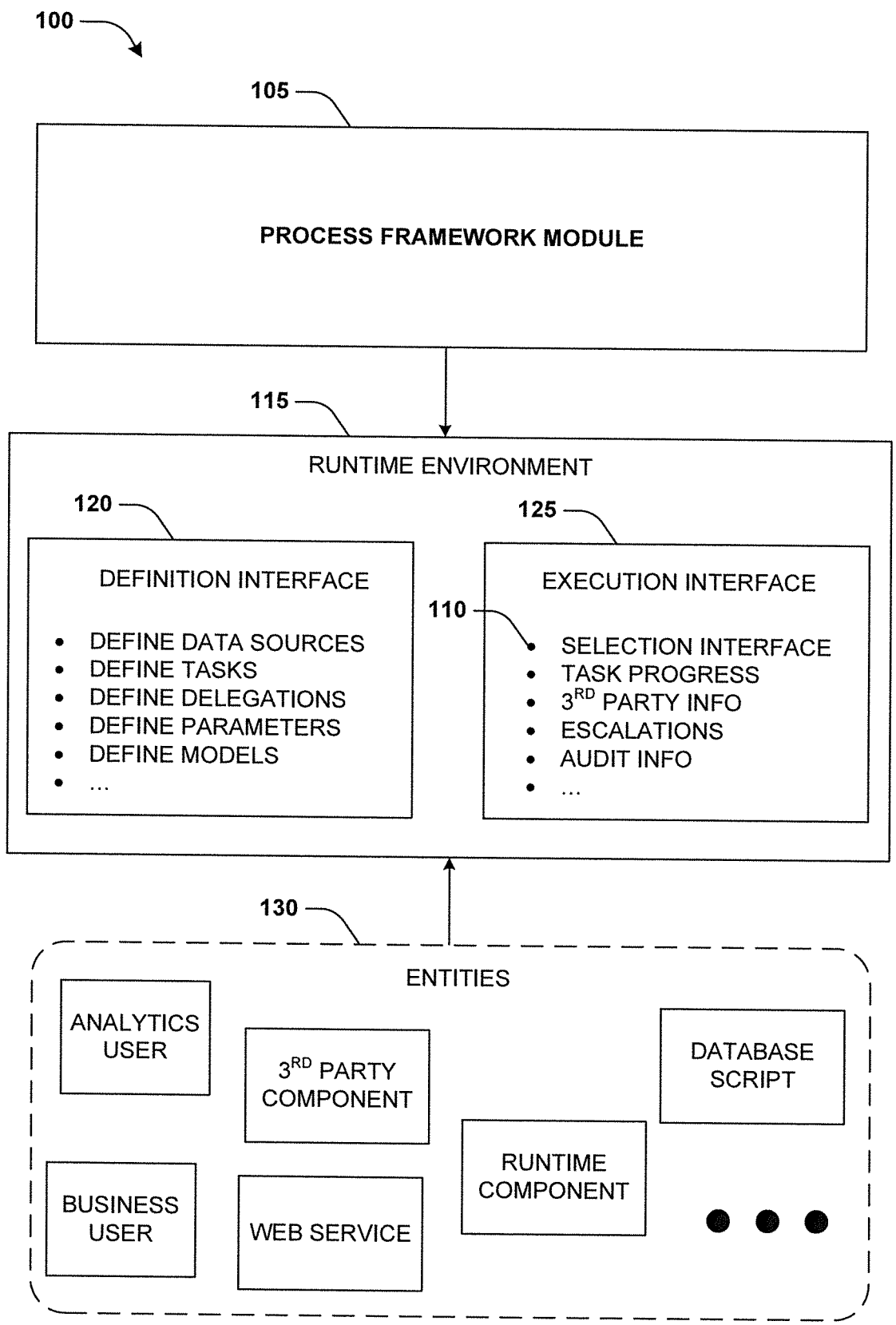
FIG. 1 illustrates an embodiment of a system associated with defining and implementing a process within a single runtime environment.

Computerized systems and methods are described herein that provide for defining and implementing a process within a single runtime environment. A runtime environment, such as an application software suite executed and displayed through a single user interface, hosts various tools for defining, executing, and tracking progress of a process. Because the tools, such as a definition interface and an execution interface, are hosted by the single runtime environment, traceability can be provided between various aspects of defining, executing, implementing, and tracking progress of the process. A user can easily identify and track correlations as to how individual tasks of a process are defined and how the process is executed as a workflow, a batch execution job, an analytical pipeline, an interactive application interface, or other execution type. The user can also track real-time progress of the individual tasks through the runtime environment. The runtime environment provides a single unified tool that can be used to define, implement, and track workflows, batch execution jobs, analytical pipelines, and interactive application interfaces with traceability between tasks, what drives those tasks, and how the tasks are implemented. In this way, the amount of computing resources, time, and probability of manual human error from manual attempts to correlate information between multiple separate tools of information stored in unrelated ways across multiple user devices is reduced.

The runtime environment allows for a process to be defined as a single process definition. The process definition can be used to execute the process from the single process definition according to various execution types. The process definition is transformed during execution to be compatible with a particular execution type. The process definition can be transformed into a workflow of a series of tasks to be performed by one or more entities. An entity may correspond to a user, a computing system, a third party component, a web service, a database transaction, a script, etc. The process definition can be transformed into a batch execution job of a task to be performed for a plurality of targets, such as for a payment process used to pay a plurality of vendors. The process definition can be transformed into an analytical pipeline of analytics to be performed upon input to create an output, such as the use a statistical model to evaluate user information to output a probability of loan default. The process definition can be transformed into an interactive application interface for user interaction with performance of the process, such as where a user can view relevant documentation and perform tasks of the process.

In one embodiment, the execution type can be selected by a user through a selection interface that is generated and displayed with a plurality of available execution types. In other embodiments, the execution type can be programmatically determined based upon a current context. The current context is derived from user submitted commands, software component commands, thresholds, triggers, database information, requests received from remote computers over a network, etc. In one embodiment, if loan default analysis is requested by a user through the runtime environment, then an analytical pipeline execution type is selected. In another embodiment, if a billing component determines that payments are due to a plurality of vendors, then a batch execution job execution type is selected. In another embodiment, if a request for a single large complex payment is received from a remote vendor computer, then a workflow execution type is selected for tracking and implementing individual tasks of the payment. In another embodiment, if a calendar entry or email of a user indicates a request for manual performance of a task, then the interactive application interface execution type is selected. In this way, computing resources are conserved because multiple separate process definitions for each execution type do not have to be define, stored, maintained, and implemented.

With reference to FIG. 1, one embodiment of a computer system 100 associated with defining and executing a process within a single runtime environment is illustrated. The system 100 includes a process framework module 105, which can be configured to execute on a computer, such as computer 715 of FIG. 7. The process framework module 105 is configured to define and execute a process within a single runtime environment 115, such as an application or user interface within which a definition interface 120, an execution interface 125, and/or other interfaces are executed and displayed.

The process framework module 105 executes the definition interface 120 in the runtime environment 115 for rendering on a display. The definition interface 120 is used for defining the process. A user can interface with the definition interface 120 to define data sources of data to use as input into the process during execution. The data sources may corresponds to a database, a website, a document, a file, information received from a remote computer such as a third party component, etc.

The user can interface with the definition interface 120 to define one or more tasks to be performed for implementing the process. In one embodiment, a regulatory compliance process may comprise a document acquisition task, a document review task, an obtain signatures task, a compliance regulation rule review task, an audit task, etc. The user can define instructions for performing the task, delegate who will perform the task, set thresholds and parameters for performing the task, set milestones for completion progress tracking, define input and output of the task, define relationships of the task to other tasks or components of the process, etc.

The user can interface with the definition interface 120 to define delegations of tasks to entities 130 that are to perform such tasks. In one embodiment, a task can be delegated to an analytics user, a business user, a third party component, a web service, a runtime component (e.g., an application), a database script, etc.

The user can interface with the definition interface 120 to define parameters used to define tasks. In one embodiment, the user can specify a threshold, a due date, an algorithm, a form to fill out, documents to review, or any other parameter defining a task.

The user can interface with the definition interface 120 to define models, algorithms, equations, statistics, business logic, or other functionality that are executed upon input data to create output data. In one embodiment, a default probability model can be defined to evaluate user information for outputting a probability of a user defaulting on a loan.

In this way, the user can define the process through the definition interface 120 as a process definition. Multiple users can collaborate through the runtime environment 115 to define various aspects of the process definition. In one embodiment, an analytics user can define a statistical model, a business user can define workflow items, a programmer can define data sources, etc.

In one embodiment, the definition interface 120 is displayed as a visual modeling environment through which visual representations of tasks, processes, statistical models, data sources, parameters, entities, and/or other components of the process can be visually defined. For example, the user may place a task icon within the definition interface 120 such as through a drag and drop operation from a process component interface of representations/icons of configurable components used to define processes. The user may place a user entity icon within the definition interface 120 such as through a drag and drop operation from the process component interface. The user may create a connection between the task icon and the user entity icon to indicate that a user, represented by the user entity icon, is to perform a task represented by the task icon. The user can select such icons and specify further information regarding such. In one embodiment, the user may specify an email address of the user, define what steps are to be performed for the task, set a threshold for the task, define a data source for input information to use for implementing the task, etc.

The process definition is stored into a data structure such as a file, a database, etc. The data structure is stored within storage accessible to the process framework module 105, such as within disks 755 or memory 735 of FIG. 7. In one embodiment, the data structure is used to load the process definition into the definition interface 120 for further defining/refining the process definition. The data structure is also used to load the process definition for executing the process. In one embodiment, multiple versions of the process definition may be stored in one or more data structures.

The process framework module 105 executes the execution interface 125 in the runtime environment 115 for rendering on the display. The execution interface 125 is used for displaying information regarding execution of the process, providing input interfaces for users to complete tasks or input information regarding progress of a task, provide users with access to data used to perform a task, provide relationship information between tasks, etc. In one embodiment, a selection interface 110 is generated. The selection interface 110 is populated with a plurality of execution types that can be supported for the process definition. An execution type is determined as being able to be supported if the process definition has task definition data, data source input definition data, parameter definition data, analytic model definition data, and/or other data that is used to execute a process according to that execution type. In one embodiment, an execution type may expect a certain data type as an input, a designation of an entity to perform a task, a statistical model or other business logic to implement, a definition of steps of how to perform a task, etc.

The selection interface 110 is populated with an execution type corresponding to a workflow of a series of task to be performed by one or more entities. In one embodiment, workflow is used for tasks, such as a database script entity performing a user account retrieval task, an accountant performing a user account update task, and other tasks to update user address information. The selection interface 110 is populated with an execution type corresponding to a batch execution job of a task to be performed for a plurality of targets, such as for a single task to send bills to a large number of vendors. The selection interface 110 is populated with an execution type corresponding to an analytical pipeline of analytics (e.g., statistical models, algorithms, etc.) to be performed upon input to create an output. The selection interface 110 is populated with an execution type corresponding to an interactive application interface for user interaction with performance of the process. In one embodiment, interactive application interface comprises a user interface through which the user can input data relating to performance of the process or a task of the process, view data used to perform the process or task, etc.

The selection interface 110 is displayed to a user through the runtime environment 115 such as through the execution interface 125. A selected execution type is received through the selection interface 110. In one embodiment, the user selects a batch execution job execution type.

In other embodiments, the execution type can be programmatically determined based upon a current context. The current context can be determined based upon various metadata, user input, signals, data received from remote computers, alerts, alarms, calendar data, task data, email data, and/or other information. In one embodiment, a user input into the runtime environment 115 may indicate that a task is to be performed a threshold number of times, such as where a bill is to be sent to a large number of clients. Accordingly, the process framework module 105 determines that the batch execution job execution type should be used to send bills as a batch job. In another embodiment, an email or any other communication is evaluated by the runtime environment 115 to determine that the email indicates that various tasks requiring user input and interaction with a user interface are to be performed. Accordingly, the process framework module 105 determines that the interactive application interface execution type should be used to provide users with a user interface to perform such tasks.

The process is executed using the process definition from the data structure. If there are multiple versions of the process definition, then a version control metric is used to select which version to use, such as a latest version, a version marked as complete, a version having an approval rating above a threshold, etc. In particular, the process definition is transformed during execution to be compatible with the selected execution type. In one embodiment, the process definition is transformed by selectively using a first portion of the process definition that is compatible with the selected execution type and ignoring (e.g., not extracting from the process definition for use) a second portion of the process definition that is not compatible with the selected execution type. In one embodiment where a bill sending process to a plurality of clients is to be executed as the batch execution job, an obtain client address task within the process definition may correspond to an expected component (e.g., input, output, functionality, a model, a data type, an algorithm, etc.), and thus is used. An update client age task or a designation of a data source table of bank branch locations may not correspond to an expected component, and thus is not used or extracted for use from the process definition. In one embodiment, the second portion of the process definition that is not compatible is transformed into a type of data compatible with the selected execution type. For example, a name of a user may be changed into an email address of the user that is an expected input (e.g., a user information database may be queried with the user name to obtain the email address for transformation).

In this way, a series of tasks, data source designations, statistical models, inputs, outputs, instructions, user interface elements, algorithms, and/or other information within the process definition is transformed into the workflow, the batch execution job, the analytical pipeline, or the interactive application interface.

In one embodiment, the process is executed in a synchronous execution mode where data is synchronously communicated between a first entity performing a first task (e.g., a web service generating billing statements) and a second entity performing a second task (e.g., a third party component providing real-time billing data used to generate billing statements). In another embodiment, the process is executed in an asynchronous execution mode where callback functionality is implemented. The callback functionality allows the process, such as a long running complex process, to wait on messages (e.g., data needed by the process to continue forward progress, such as billing data needed for generating a billing statement) to arrive in a message queue.

In one embodiment, the process comprises a first task and a second task. A first entity such as a first user may be invoked to execute the first task in parallel with a second entity such as a database script to execute the second task. In another embodiment, a determination is made that the second task is dependent upon completion of the first task. Accordingly, the second entity is invoked to perform the second task upon a determination that the first entity has completed the first task.

The execution interface 125 is populated with information regarding the execution and performance of the process. The execution interface 125 is populated with documents, links to data, and other information that can be used to perform a task. The execution interface 125 is populated with user interfaces through which a user can perform a task, specify how a task was performed, input results of the task, etc.

In one embodiment, the execution interface 125 is populated with task completion functionality such as a user interface through which a user can perform an assigned task. In another embodiment, the execution interface 125 is populated with tracing data regarding an association between a first task of the process and a second task of the process, such as a dependency of the first task upon completion of or data from the second task. In another embodiment, the execution interface 125 is populated with completion indicators of task completion, such as percentage indicators or a real-time visualization depicting real-time progress of individual tasks. The execution interface 125 is populated with inputs, outputs, descriptions of analytics, descriptions of functionality, descriptions of algorithms, errors, computational results, task results, and/or other information relating to various aspects of the process being implemented. The execution interface 125 is populated with auditing functionality to audit performance of one or more tasks of the process, such as to whom a task has been delegated, progress of the task, how the task is/was performed, output data from the task, etc.

In one embodiment, undo functionality is provided through the execution interface 125. A transaction of the process (e.g., a database transaction) is identified for being committed as a committed transaction. An undo data structure is created. The undo data structure can be invoked through the execution interface 125 to undo the committed transaction.

In one embodiment, a state machine is maintained regarding process of implementing the process. The state machine may have various states relating to completion of individual tasks of the process. The execution interface 125 is populated with a current state of the state machine, such as a visualization depicting the current state of individual tasks, relationships and dependencies between tasks, etc.

In one embodiment, automated escalation of a task to a user is performed when a time to complete the task has expired without the task being completed. Information regarding the automated escalation is provided through the execution interface 125. In one embodiment, automated delegation of a task to an entity is performed, such as delegation to a user based upon a characteristic of the task matching a characteristic of the entity. For example, a review employee history task may be assigned to a human resources user based upon a job title of the human resources user corresponding to employee employment review.

In one embodiment, the process framework module 105 determines that the process definition specifies a third party component that is to perform a task of the process. Because functionality and parameters of the third party component may otherwise be hidden from users of the runtime environment 115, the process framework module 105 is configured to extract and expose such information. In particular, a communication connection is established over a network to a remote computing device hosting the third party component. The third party component is registered with the process framework module 105 through a registration process. The third party component is queried over the communication connection to identify metadata defining parameters, functionality, and/or other information used by the third party component (e.g., algorithms, statistical models, inputs, outputs, equations, etc.). The execution interface 125 is populated with an identification of the parameters and functionality.

This is way, a process can be defined and executed through the runtime environment 115.

Figure 2:
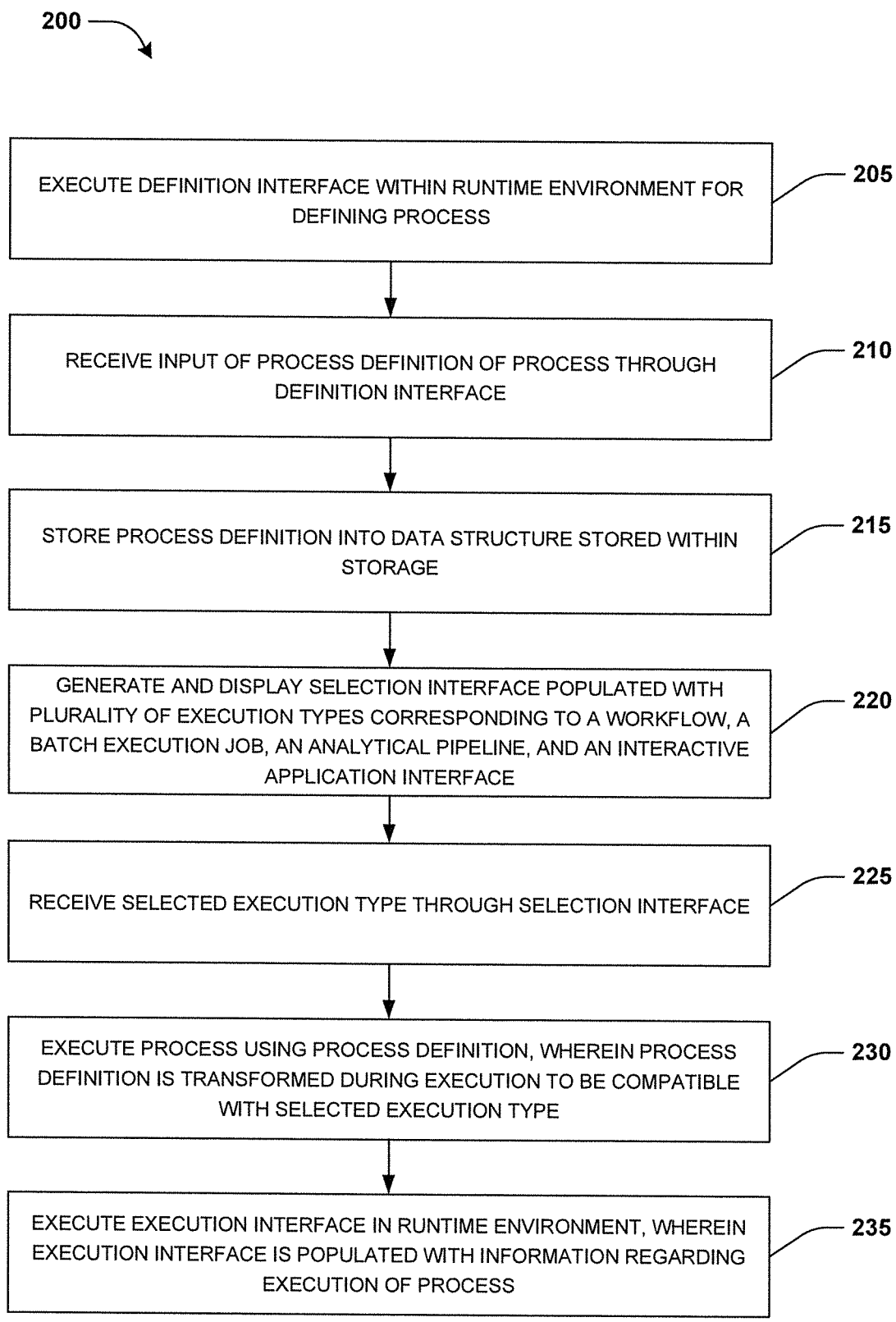
FIG. 2 illustrates an embodiment of a method associated with defining and implementing a process within a single runtime environment.

With reference to FIG. 2, one embodiment of a computer implemented method 200 associated with defining and executing a process through a single runtime environment is illustrated. In one embodiment, the method 200 is performed by the process framework module 105 utilizing various computing resources of the computer 715, such as the processor 720 for executing instructions associated with executing a definition interface, a process, and an execution interface. Memory 735 and/or disks 755 are used for storing a data structure of a process definition and/or other data. Network hardware is used for communicating data structures between the computer 715 and remote computers over a network, such as a third party component accessed by a process. The method 200 is triggered upon a command to access a runtime environment.

Figure 3:
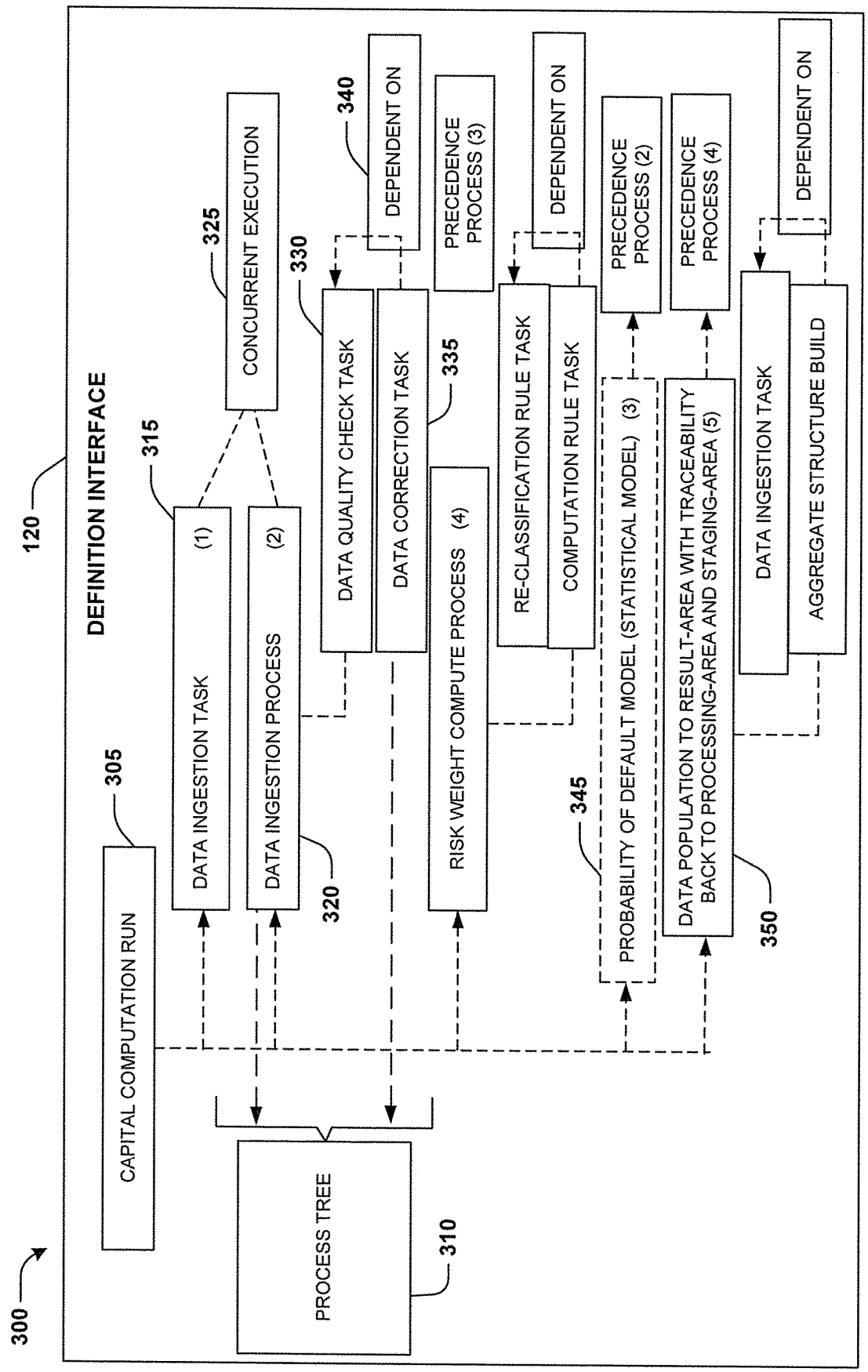
FIG. 3 illustrates an embodiment of a system associated with defining and implementing a process within a single runtime environment, where a process is defined through a definition interface.

At 205, a definition interface 120 is executed within the runtime environment to render the definition interface 120 on a display for defining the process, as illustrated by example system 300 of FIG. 3. At 210, input of a process definition 405 of the process is received through the definition interface 120. In one embodiment, the input is provided through a visual modeling environment where processes, tasks, instructions, data output, data sources, statistical models, dependencies, entities, rules, and/or other components are visually represented by icons, connecting lines, execution order lines, or other user interface elements. For example, the user may place a process tree icon 310 into the visual modeling environment to represent a process tree. The user may place a capital computation run icon 305, representing a capital computation function to perform, into the visual modeling environment.

The user may place component icons into the visual modeling environment, such as a data ingestion task icon 315 of a data ingestion task that is to execute concurrently (e.g., represented by concurrent execution icon 325) with a data ingestion process represented by a data ingestion process icon 320. The user may place a data quality check task icon 330 and a data correction task icon 335 to represent tasks of the data ingestion process. A dependency icon 340 is used to show that the data correction task is dependent upon the data quality check task. The user may place a statistical model icon 345, representing a statistical model to execute, within the visual modeling environment. The user may place a data population function icon 350, representing data population into a result area with traceability to a process area and staging area, into the virtual modeling environment. It may be appreciated that FIG. 3 is merely an example of some user interface elements used to represent tasks, processes, models, functions, dependencies, order of execution/implementation, and/or other components of a process that a user can visually configure to define the process definition 405. At 215, the process definition 405 is stored into a data structure stored within storage.

Figure 4:
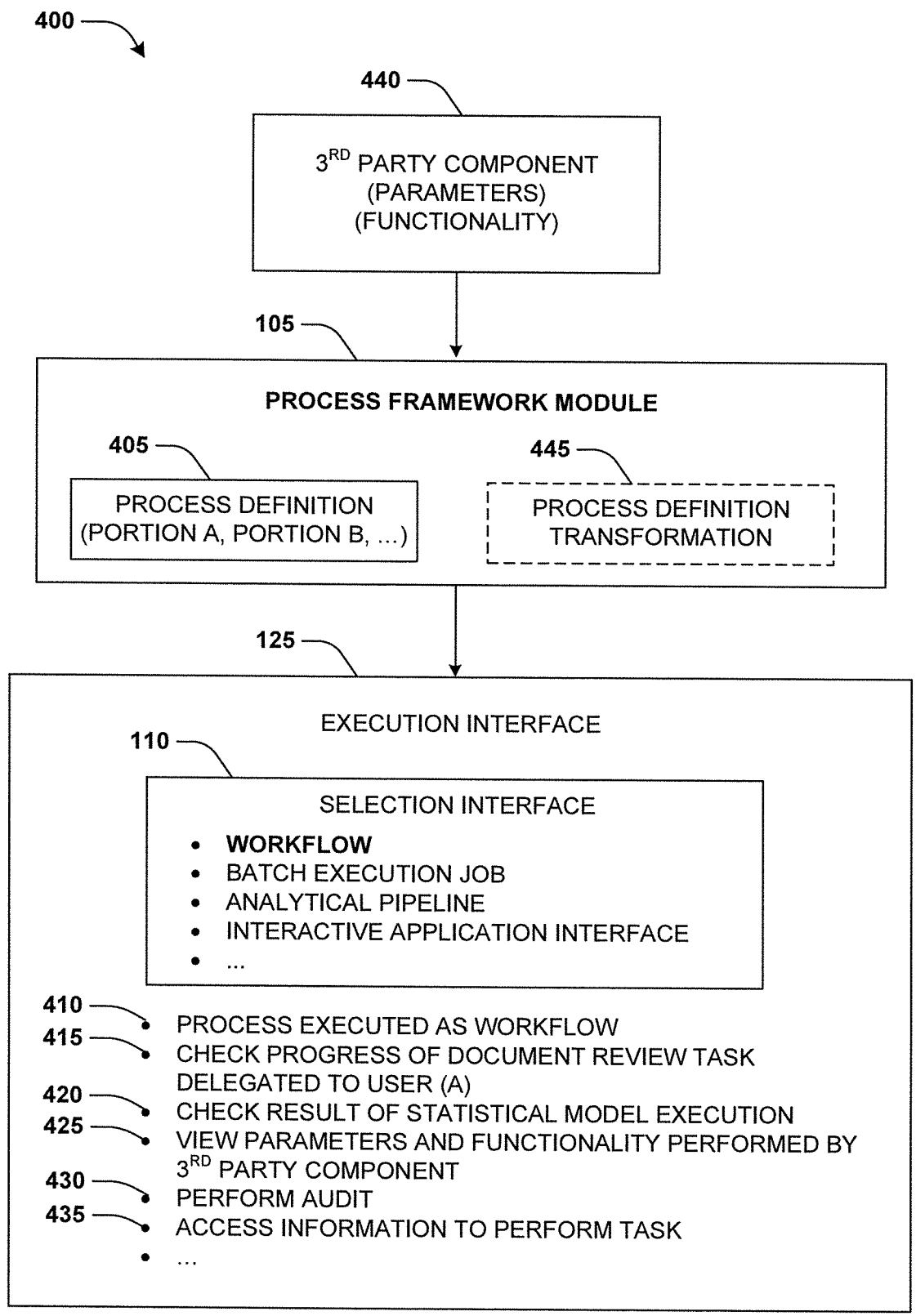
FIG. 4 illustrates an embodiment of a system associated with defining and implementing a process within a single runtime environment, where a process definition is used to execute a process as a workflow.

At 220, a selection interface 110 is generated and displayed, as illustrated in example 400 of FIG. 4. In one embodiment, the selection interface 110 is populated with a plurality of execution types available for executing processes. The selection interface 110 is populated with an execution type corresponding to a workflow of a series of tasks to be performed by one or more entities. The selection interface 110 is populated with an execution type corresponding to a batch execution job of a task to be performed for a plurality of targets. The selection interface 110 is populated with an execution type corresponding to an analytical pipeline of analytics to be performed upon input to create an output. The selection interface 110 is populated with an execution type corresponding to an interactive application interface for user interaction with performance of the process. At 225, a selected execution type is received through the selection interface 110. For example, a user may select a workflow execution type.

In an alternative embodiment, the selected execution type is programmatically selected based upon a context, as opposed to the selection interface 110 being generated, displayed, and used to receive a selection of the selected execution type. The context is determined by the process framework module 105 based upon various data, such as a scheduled task to perform (e.g., a billing software module indicating that bills are due to be sent to clients), a request from a client or computing system for a task to be performed (e.g., a vendor computing system sends a request for payment of a bill), a calendar entry indicated that a document review task is to be done by a user, an email instructing a user to perform an employee review task, etc.

At 230, the process is executed using the process definition 405 from the data structure. The process definition 405 is transformed 445 during execution to be compatible with the selected execution type, such as the workflow execution type. In one embodiment, the process definition 405 has portions that are compatible with certain execution types and not other execution types. A portion can correspond to a task, a data source, a statistical model, an input, an output, a data type, an entity, a function, a database script, an algorithm, a user identifier, task dependency and order of implementation data, and/or a variety of other information used to implement the process. Accordingly, the process definition 405 is transformed 445 by using portions of the process definition that are compatible with the workflow execution type (e.g., match a data type, a function type, a task type, a data source type, or other expect information). Other portions of the process definition 405 are either ignored (e.g., not used or extracted from the process definition 405 when executing and implementing the process) or can be converted into a format compatible with the workflow execution type (e.g., a data type conversion, a modification to a function to match an expected function type, etc.).

In one embodiment, the process definition 405 utilizes a third party component 440 to perform some sort of functionality for implementing the process. The third party component 440 may not generally expose internal parameters and functionality used by the third party component 440. Instead, the third party component 440 may accept input and provide output. Accordingly, the process framework module 105 can register the third party component 440 in order to query and obtain information regarding the parameters and functionality used by the third party component 440. Such third party component information can be provided 425 to a user through an execution interface 125 that is populated with information regarding execution of the process.

At 235, the execution interface 125 is executed in the runtime environment to render the execution interface 125 on the display. Various information regarding the execution and implementation of the process is populated within the execution interface 125. In one embodiment, an indication 410 is provided that the process is being executed as a workflow. In another embodiment, task progress information 415 is provided, such as an ability to view progress of a document review task delegated to a user (A). In another embodiment, result data 420 of a task, function, analytical model, etc. is provided, such as an ability to check results of a statistical model that was executed as part of implementing the process as the workflow. In another embodiment, auditing information 430 is provided so that a user can view what input information was considered, how the input information was processed, and what output information was determined at each step of implementing the process. In another embodiment, access 435 to information, such as files, used to perform a task is provided.

Figure 5:
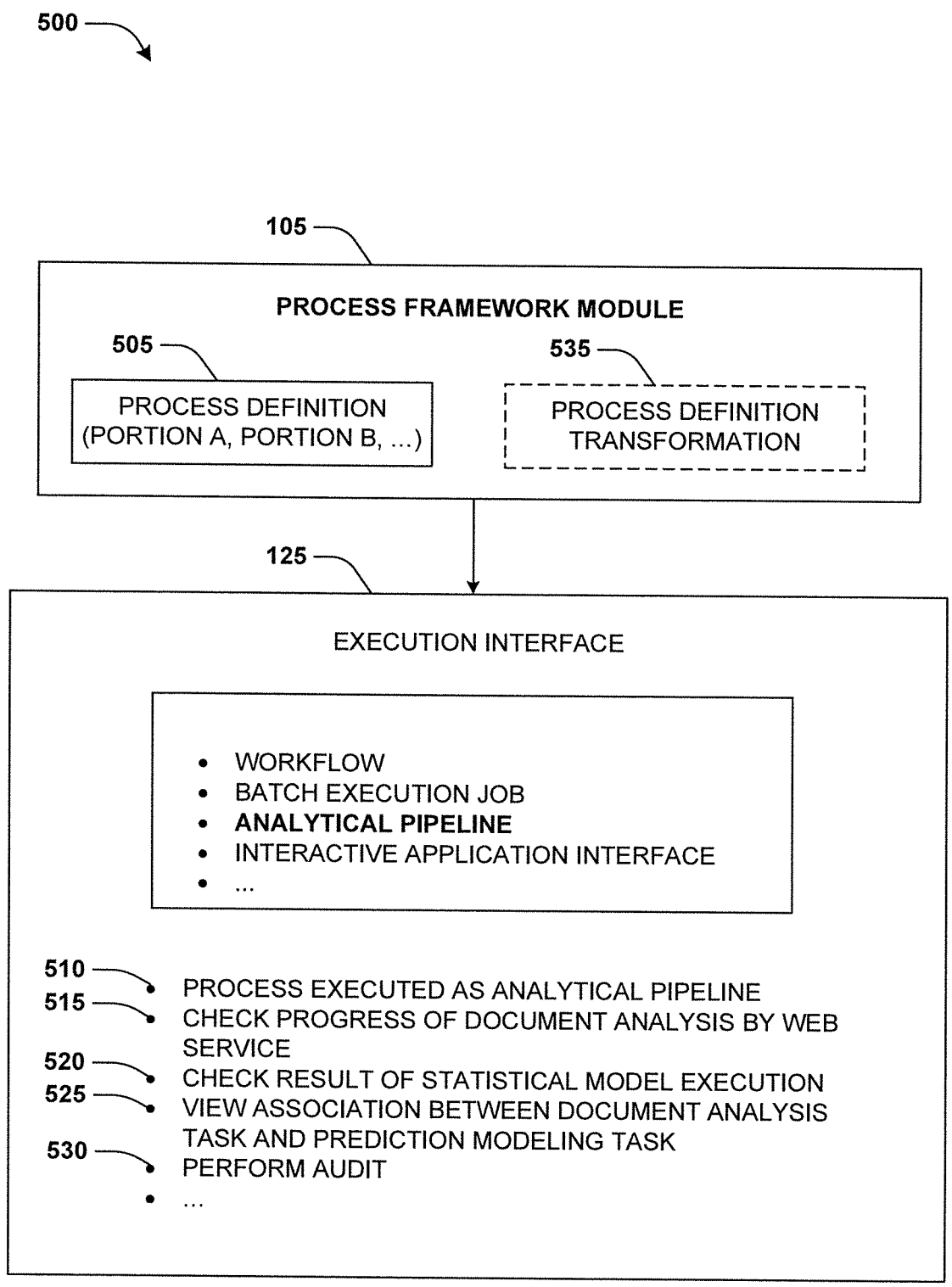
FIG. 5 illustrates an embodiment of a system associated with defining and implementing a process within a single runtime environment, where a process definition is used to execute a process as an analytical pipeline.

FIG. 5 is an illustration of a system 500 for defining and executing a process within a single runtime environment. A process definition 505, of the process, may have been defined through a definition interface of the runtime environment. The process definition 505 may define a document analysis task, a prediction modeling task, a statistical model to execute, entities to perform tasks such as a web service, input data, data sources, associations between tasks, etc.

The process framework module 105 is configured to determine a context indicative of how the process definition 505 should be used to execute the process. In one embodiment, an invoice component of a retailer may receive a customer complaint regarding an invoice. The receipt of the customer complaint is evaluated to determine the context as a workflow of evaluating the complaint. In another embodiment, an inventory component of a retailer may determine that there is a serious discrepancy between inventory levels, which will require human intervention and review through a user interface. Accordingly, an interactive application interface through which an inventory control employee can perform inventory auditing may be determined as the context. In another embodiment, a billing component may determine that a plurality of bills should be sent to customers. Accordingly, a batch execution job may be determined as the context.

In another embodiment, a user submits a command to predict success of a marketing campaign. Accordingly, an analytical pipeline used to execute analytics for predicting a success rate may be determined as the context. The process framework module 105 selectively utilizes portions of the process definition 505 that are compatible with an analytical pipeline execution type. In one embodiment, expect data types, tasks, and a statistical model executable by an analytical pipeline are determined as compatible. Other portions may be left unused or may be transformed into a format compatible with the analytical pipeline (e.g., modification to a data type, a task, a function, an algorithm, etc.). In this way, the process framework module 105 transforms 535 the process definition 505 during execution to be compatible with the analytical pipeline execution type.

An execution interface 125 is executed within the runtime environment to render the execution interface 125 on a display. The execution interface 125 is populated with information regarding execution of the process. In one embodiment, an indication 510 that the process is being executed as the analytical pipeline execution type is provided. An ability 515 to check progress of a document analysis by a web service is provided. An ability 520 to check results of execution of a statistical model is provided. An ability 525 to view an association or relationship between a document analysis task and a prediction modeling task is provided. An ability 530 to perform an audit of implementation of the process is provided, such as to view inputs, outputs, executed functionality, tasks, and/or other information regarding each step of implementing the process.

Figure 6:
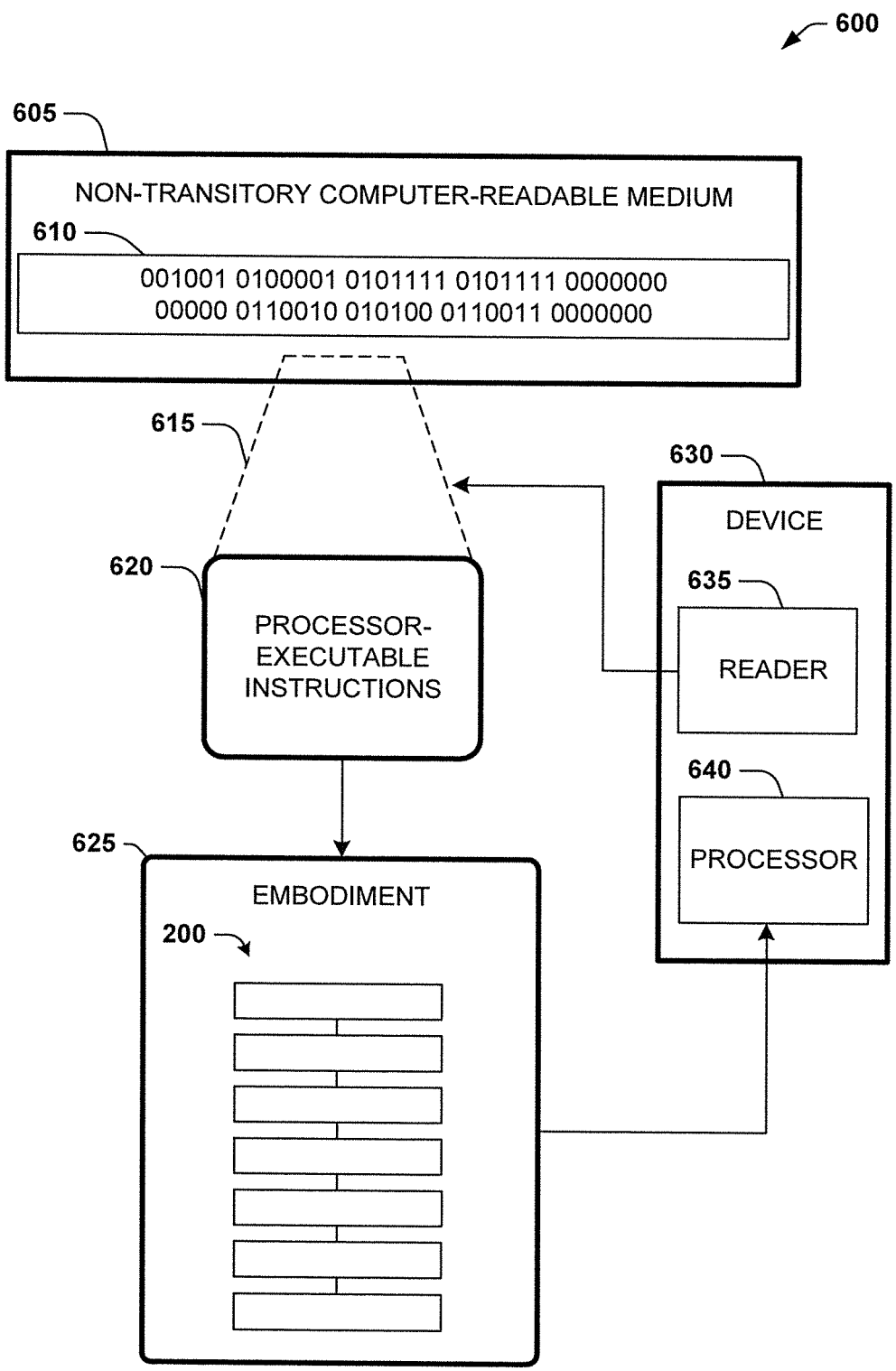
FIG. 6 illustrates an embodiment of a non-transitory computer-readable medium.

FIG. 6 is an illustration of a scenario 600 involving an example non-transitory computer-readable medium 605. In one embodiment, one or more of the components described herein are configured as program modules, such as the process framework module 105, stored in the non-transitory computer-readable medium 605. The program modules are configured with stored instructions, such as processor-executable instructions 620, that when executed by at least a processor, such as processor 640, cause the computing device to perform the corresponding function(s) as described herein. In one embodiment, the, functionality of the process framework module 105, stored in the non-transitory computer-readable medium 605, may be executed by the processor 640 as the processor-executable instructions 620 to perform an embodiment 625 of the method 200 of FIG. 2.

The non-transitory computer-readable medium 605 includes the processor-executable instructions 620 that when executed by a processor 640 cause performance of at least some of the provisions herein. The non-transitory computer-readable medium 605 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 605 stores computer-readable data 610 that, when subjected to reading 615 by a reader 635 of a device 630 (e.g., a read head of a hard disk drive, or a read operation invoked on a solid-state storage device), express the processor-executable instructions 620.

In some embodiments, the processor-executable instructions 620, when executed cause performance of operations, such as at least some of the example method 200 of FIG. 2, for example. In some embodiments, the processor-executable instructions 620 are configured to cause implementation of a system, such as at least some of the example system 100 of FIG. 1, for example.

Figure 7:
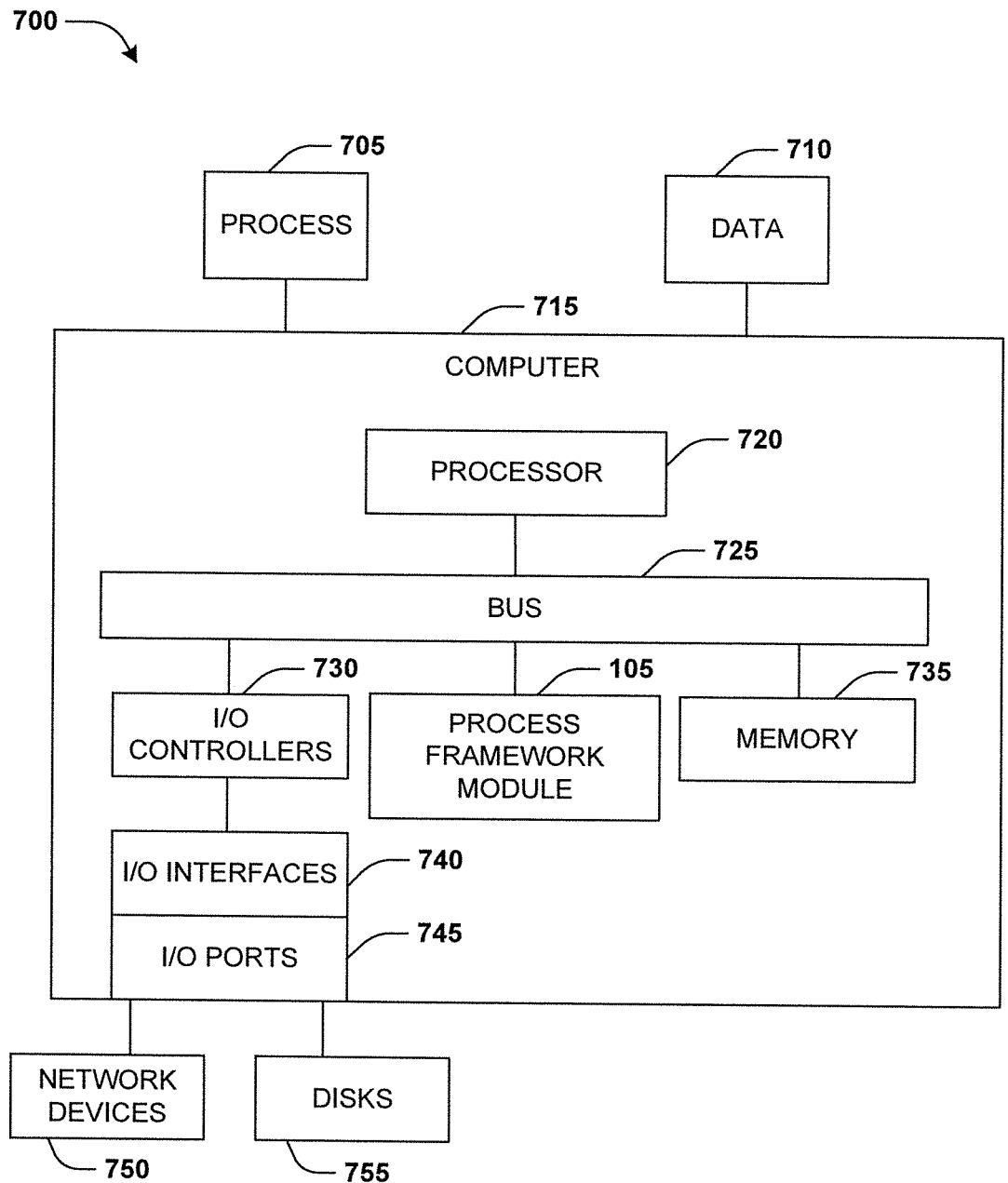
FIG. 7 illustrates an embodiment of a computing system configured with the example systems and/or methods disclosed.

FIG. 7 illustrates an example computing device 700 that is configured and/or programmed with one or more of the example systems and methods described herein, and/or equivalents. The example computing device 700 may be the computer 715 that includes a processor 720, a memory 735, and I/O ports 745 operably connected by a bus 725. In one embodiment, the, the computer 715 may include logic of the process framework module 105 configured to facilitate the system 100 and/or the method 200 shown in FIGS. 1-2. In different embodiments, the logic of the process framework module 105 may be implemented in hardware, a non-transitory computer-readable medium 705 with stored instructions, firmware, and/or combinations thereof. While the logic of the process framework module 105 is illustrated as a hardware component attached to the bus 725, it is to be appreciated that in other embodiments, the logic of the process framework module 105 could be implemented in the processor 720, stored in memory 735, or stored in disk 755.

In one embodiment, logic of the process framework module 105 or the computer 715 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 715 as data 710 that are temporarily stored in memory 735 and then executed by processor 720.

The logic of the process framework module 105 may also provide means (e.g., hardware, non-transitory computer-readable medium 705 that stores executable instructions, firmware) for performing rule based source sequencing for allocation.

Generally describing an example configuration of the computer 715, the processor 720 may be a variety of various processors including dual microprocessor and other multi-processor architectures. The memory 735 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 755 may be operably connected to the computer 715 via, for example, the I/O interface 740 (e.g., card, device) and the I/O ports 745. The disks 755 may be, for example, a magnetic disk drive, a solid state disk drive, a floppy disk drive, a tape drive, a Zip drive, a flash memory card, a memory stick, and so on. Furthermore, the disks 755 may be a CD-ROM drive, a CD-R drive, a CD-RW drive, a DVD ROM, and so on. The memory 735 can store a process, such as within the non-transitory computer-readable medium 705, and/or data 710, for example. The disk 755 and/or the memory 735 can store an operating system that controls and allocates resources of the computer 715.

The computer 715 may interact with input/output (I/O) devices via the I/O interfaces 740 and the I/O ports 745. The I/O devices may be, for example, a keyboard, a microphone, a pointing and selection device, cameras, video cards, displays, the disks 755, the network devices 750, and so on. The I/O ports 745 may include, for example, serial ports, parallel ports, and USB ports. I/O controllers 730 may connect the I/O interfaces 740 to the bus 725.

The computer 715 can operate in a network environment and thus may be connected to the network devices 750 via the I/O interfaces 740, and/or the I/O ports 745. Through the network devices 750, the computer 715 may interact with a network. Through the network, the computer 715 may be logically connected to remote computers (e.g., the computer 715 may reside within a distributed computing environment to which clients may connect). Networks with which the computer 715 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to define and execute a process within a single runtime environment, the process comprising:

executing a definition interface in the runtime environment to render the definition interface on a display for defining the process;

receiving input of a process definition of the process through the definition interface;

storing the process definition into a data structure stored within storage;

generating and displaying, on the display, a selection interface populated with a plurality of execution types that are selectable, wherein the plurality of execution types include at least two of the following execution types: (i) a workflow of a series of tasks to be performed by one or more entities, (ii) a batch execution job of a task to be performed for a plurality of targets, (iii) an analytical pipeline of analytics to be performed upon input to create an output, or (iv) an interactive application interface for user interaction with performance of the process; and in response to receiving, from the selection interface, a selected execution type from the plurality of execution types:

executing the process using the process definition from the data structure, wherein the process definition is transformed during execution to be compatible with the selected execution type; and executing an execution interface in the runtime environment to render the execution interface on the display, wherein the execution interface is populated with information regarding execution of the process.

2. The non-transitory computer-readable medium of claim 1, wherein the computer-executable instructions cause the processor to:
   determine that the process definition specifies a third party component that is to perform a task of the process;
   establish a communication connection over a network to a remote computing device hosting the third party component;
   query the third party component over the communication connection to identify metadata defining parameters and functionality used by the third party component; and
   populate the execution interface with an identification of the parameters and functionality.

3. The non-transitory computer-readable medium of claim 1, wherein the computer-executable instructions for executing the process comprise computer-executable instructions to cause the processor to:
   execute the process in a synchronous execution mode where data is synchronously communicated between a first entity performing a first task of the process and a second entity performing a second task of the process.

4. The non-transitory computer-readable medium of claim 1, wherein the computer-executable instructions for executing the process comprise computer-executable instructions to cause the processor to:
   execute the process in an asynchronous execution mode where callback functionality is implemented, for the process, for waiting on messages to arrive in a message queue.

5. The non-transitory computer-readable medium of claim 1, wherein the computer-executable instructions for executing the process comprise computer-executable instructions to cause the processor to:
   invoke a first entity to execute a first task of the process in parallel with invoking a second entity to execute a second task of the process.

6. The non-transitory computer-readable medium of claim 1, wherein the computer-executable instructions for executing the process comprise computer-executable instructions to cause the processor to:
   determine that a first version of the process definition and a second version of the process definition are available; and
   select the first version for execution based upon a version control metric.

7. The non-transitory computer-readable medium of claim 1, wherein the computer-executable instructions for executing the process comprise computer-executable instructions to cause the processor to:
   determine that a transaction of the process is to be committed as a committed transaction; and
   create an undo data structure used to undo the committed transaction.

8. The non-transitory computer-readable medium of claim 1, wherein the computer-executable instructions for executing the process comprise computer-executable instructions to cause the processor to:
   determine that a second task is dependent upon completion of a first task; and
   upon determining that a first entity has completed the first task, invoke a second entity to perform the second task.

9. A computing system, comprising:
   a processor connected to memory; and
   a process framework module stored on a non-transitory computer readable medium and configured with instructions that when executed by the processor cause the processor to:
      execute a definition interface in a runtime environment to render the definition interface on a display for defining a process;
      receive input of a process definition of the process through the definition interface;
      store the process definition into a data structure stored within storage;
      generate and display, on the display, a selection interface populated with a plurality of execution types that are selectable, wherein the plurality of execution types include at least two of the following execution types: (i) a workflow of a series of tasks to be performed by one or more entities, (ii) a batch execution job of a task to be performed for a plurality of targets, (iii) an analytical pipeline of analytics to be performed upon input to create an output, or (iv) an interactive application interface for user interaction with performance of the process; and
      in response to receiving, from the selection interface, a selected execution type from the plurality of execution types:
         executing the process using the process definition from the data structure, wherein the process definition is transformed during execution to be compatible with the selected execution type; and
         executing an execution interface in the runtime environment to render the execution interface on the display, wherein the execution interface is populated with information regarding execution of the process.

10. The computing system of claim 9, wherein the instructions for executing the execution interface comprise instructions to cause the processor to:
   populate the execution interface with tracing data regarding an association between a first task of the process and a second task of the process.

11. The computing system of claim 9, wherein the instructions for executing the execution interface comprise instructions to cause the processor to:
   maintain a state machine regarding progress of the process; and
   populate the execution interface with a current state of the state machine.

12. The computing system of claim 9, wherein the instructions for executing the process comprise instructions to cause the processor to:
   construct a real-time visualization depicting real-time progress of one or more tasks of the process; and
   populate the execution interface with the real-time visualization.

13. The computing system of claim 9, wherein the instructions for executing the process comprise instructions to cause the processor to:
   transform a series of tasks, defined within the process definition, into one of the workflow, the batch execution job, the analytical pipeline, or interactive application interface.

14. A computer-implemented method, the computer-implemented method involving a computing device comprising a processor, and the computer-implemented method comprising:

executing, by the processor, a definition interface in a runtime environment to render the definition interface on a display for defining a process;

receiving, by the processor, input of a process definition of the process through the definition interface;

storing, by the processor, the process definition into a data structure stored within storage;

generating and displaying, by the processor on the display, a selection interface populated with a plurality of execution types, wherein the plurality of execution types include at least two of the following execution types: (i) a workflow of a series of tasks to be performed by one or more entities, (ii) a batch execution job of a task to be performed for a plurality of targets, (iii) an analytical pipeline of analytics to be performed upon input to create an output, or (iv) an interactive application interface for user interaction with performance of the process; and in response to receiving, from the selection interface, a selected execution type from the plurality of execution types:

executing, by the processor, the process using the process definition from the data structure, wherein the process definition is transformed during execution to be compatible with the selected execution type; and executing, by the processor, an execution interface in the runtime environment to render the execution interface on the display, wherein the execution interface is populated with information regarding execution of the process.

15. The computer-implemented method of claim 14, further comprising:

determining, by the processor, that the selected execution type utilizes a first type of data;

utilizing, by the processor, a first portion of the process definition that is compatible with the first type of data; and transforming, by the processor, a second portion of the process definition that is not compatible with the selected execution type into a type of data compatible with the selected execution type.

16. The computer-implemented method of claim 14, further comprising:

populating, by the processor, the definition interface with a visual modeling environment through which visual representations of tasks, processes, models, data sources used to provide input for task execution, and entities for performing tasks can be populated to define the process.

17. The computer-implemented method of claim 14, further comprising:

performing, by the processor, automated escalation of a task to a user based upon a due date for the task lapsing; and populating, by the processor, the execution interface with information regarding the automated escalation.

18. The computer-implemented method of claim 14, further comprising:

performing, by the processor, automated delegation of a task to an entity based upon a characteristic of the task matching a characteristic of the entity; and populating, by the processor, the execution interface with information regarding the automated delegation.

19. The computer-implemented method of claim 14, further comprising:

populating, by the processor, the execution interface with auditing functionality to audit performance of one or more tasks of the process.

20. The computer-implemented method of claim 14, wherein the transformation includes (i) using a first portion of the process definition that is compatible with the selected execution type without transformation, and (ii) transforming a second portion of the process definition that is not compatible with the selected definition type into a type of data that is compatible with the selected execution type.

* * * * *